United States Patent [19]

Carp et al.

[11] 3,877,755
[45] Apr. 15, 1975

[54] LATCHING GATE FOR ADAPTIVE BRAKING SYSTEM

[75] Inventors: Ralph W. Carp, Baltimore; Frederick O. Miesterfeld, Joppa, both of Md.; George B. Hickner, Niles, Mich.

[73] Assignee: The Bendix Corporation, Baltimore, Md.

[22] Filed: July 14, 1972

[21] Appl. No.: 289,044

Related U.S. Application Data

[63] Continuation of Ser. No. 72,474, Sept. 15, 1970, abandoned.

[52] U.S. Cl. .............................. 303/21 P; 303/20
[51] Int. Cl. .............................................. B60t 8/12
[58] Field of Search ............... 188/181; 303/20, 21; 307/10 R; 317/5; 324/161–162; 340/53, 262, 263

[56] References Cited
UNITED STATES PATENTS

| | | |
|---|---|---|
| 3,275,384 | 9/1966 | Hirzel .......................... 303/21 EB |
| 3,494,671 | 2/1970 | Slavin et al. ..................... 303/21 P |
| 3,524,685 | 8/1970 | Harned et al. .................. 303/21 BE |
| 3,556,610 | 1/1971 | Leiber ............................. 303/21 P |
| 3,574,417 | 4/1971 | Howard et al. ................... 303/21 P |
| 3,578,819 | 5/1971 | Atkins ............................. 303/21 P |

*Primary Examiner*—Trygve M. Blix
*Assistant Examiner*—Stephen G. Kunin
*Attorney, Agent, or Firm*—W. G. Christoforo; Bruce L. Lamb

[57] ABSTRACT

In an adaptive braking system for trucks, automobiles and the like a latching gate is provided to block a control channel generated control signal from activating a brake pressure modulator until there is present simultaneously at the gate input a signal indicating that a control wheel is exceeding a first deceleration reference level and that the deceleration history of the control wheel as compared to wheel rotational velocity has satisfied proper criteria.

4 Claims, 6 Drawing Figures

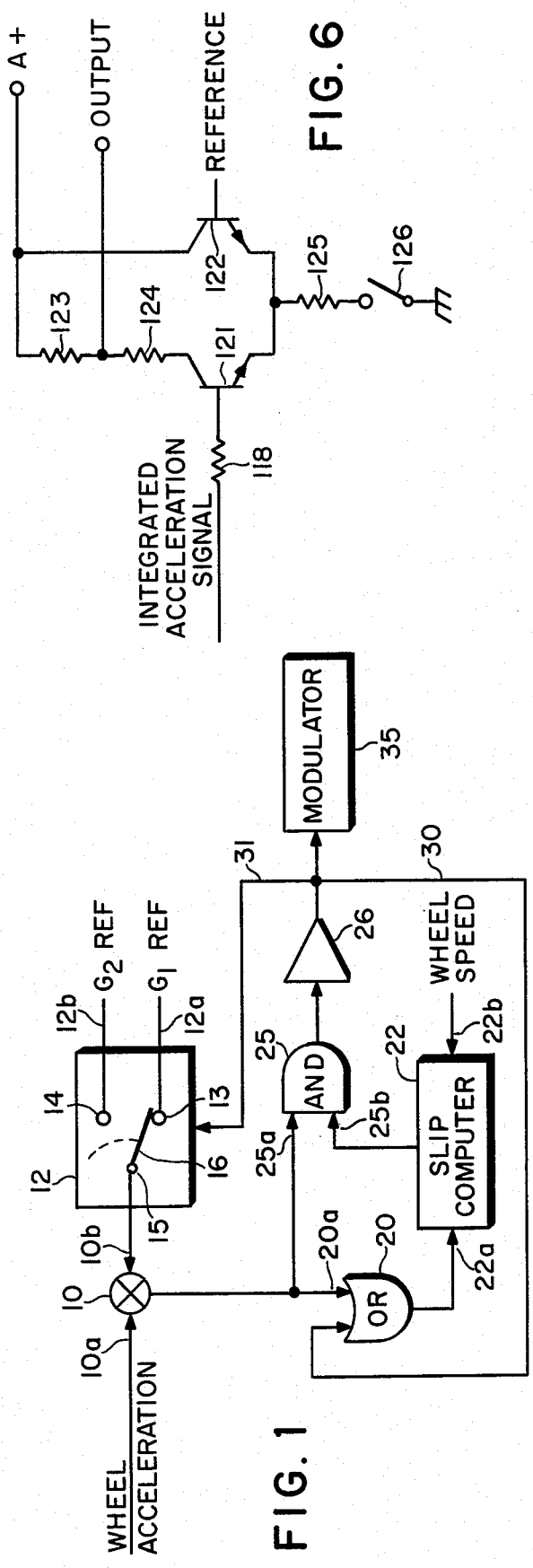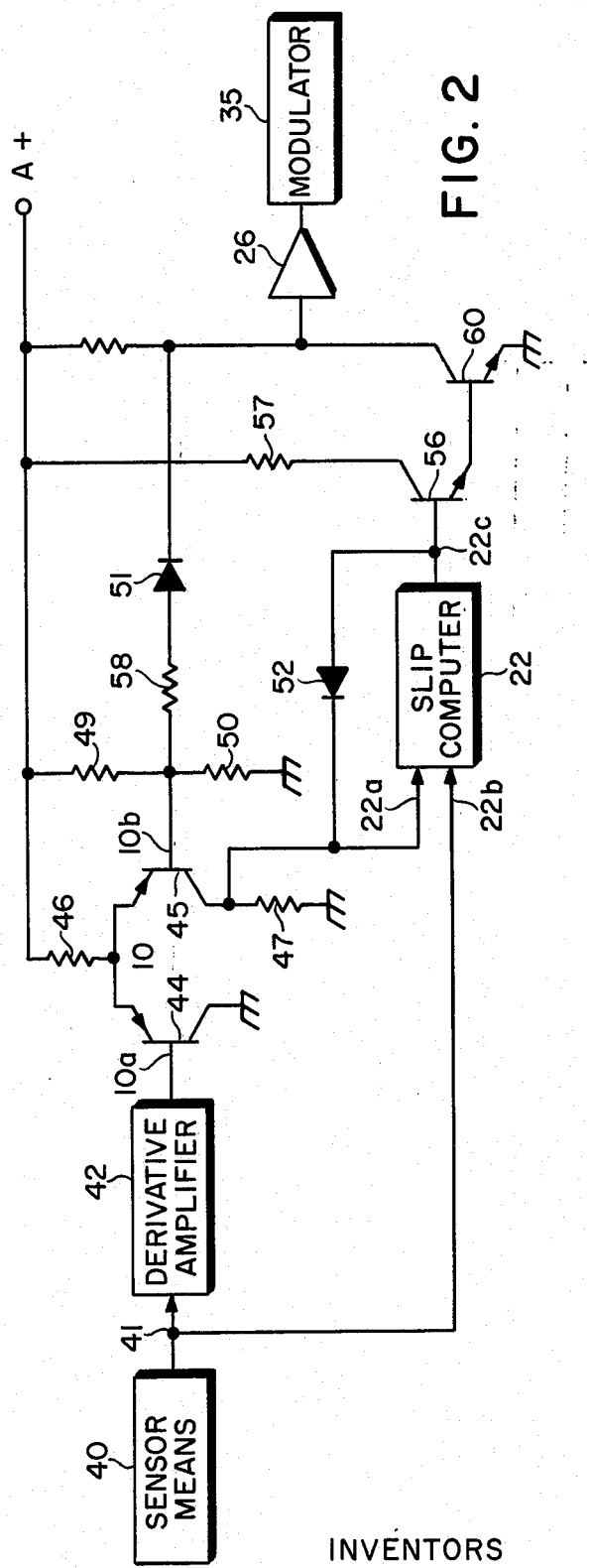

LATCHING GATE FOR ADAPTIVE BRAKING SYSTEM

This is a continuation of application Ser. No. 72,474 filed Sept. 15, 1970 now abandoned.

CROSS REFERENCES TO RELATED PATENT APPLICATIONS

The latching gate disclosed herein is an improvement for adaptive braking systems of the type disclosed in a patent application for "Automobile Antiskid Control System" by M. Slavin et al., application Ser. No. 712,672, filed Mar. 13, 1968, now U.S. Pat. No. 3,494,671, and which is assigned to the assignee of the present application. The prior application is specifically referred to below and hereby incorporated by reference.

SUMMARY OF INVENTION

This invention relates to adaptive braking systems for automobiles and the like and particularly to improvements for said systems which require certain wheel dynamic criteria to be satisfied before the system is completely activated to the point of assuming automatic braking control.

The wheel braking pressure which can be exerted by a motor vehicle operator is sufficient to cause the wheels to lock with resultant increase in stopping distance and reduced lateral vehicle stability. This is especially true when driving on low frictional coefficient surfaces. However, it is possible to optimize braking characteristics of a wheeled vehicle under any tire-road interface condition by providing the vehicle with an adaptive braking system which will modulate the braking pressure to a pressure which maximizes the frictional force at the tire-road interface. In the aforementioned patent application there is described an adaptive braking system which is comprised basically of an electronic control channel for each wheel or group of wheels to be controlled. Briefly, a control channel includes a wheel sensor means which generates a d.c. voltage level proportional to wheel rotational speed, a derivative amplifier which generates a d.c. voltage level proportional to wheel acceleration and a number of comparators which compare actual wheel acceleration (or deceleration) with fixed reference levels corresponding to predetermined values of wheel acceleration and deceleration to generate error signals. The error signals are applied to means which in response thereto vary brake fluid pressure at the controlled wheel to maintain wheel slip at a value which tends to maximize the frictional force developed at the tire-road interface. The aforementioned system is partially activated when the vehicle operator depresses his brake pedal and resultant wheel deceleration reaches a first of the said reference levels which corresponds to a fixed amount of wheel deceleration. Thereafter, automatic braking control of the controlled wheel is delayed until certain wheel velocity criteria have been satisfied. In particular, if during a predetermined time period after the wheel has decelerated to the first reference level, wheel speed drops to or below a certain percentage of the wheel speed at the time the brakes were applied, the adaptive braking system is fully activated and the brake fluid pressure at the controlled wheel is thereafter automatically varied as the vehicle is brought to a controlled stop. The advantages of this type of delay can be seen when it is considered that a brake control wheel may strike an imperfection in the road's surface, momentarily imparting a high level of wheel deceleration to the wheel, possibly causing the automatic adaptive braking system which is not equipped with such a delay means to assume control of the braking even though optimum braking characteristics would have been obtained in that case through continued manual control of the braking system.

This initial delay can be made even more adaptive by a means which computes the correct delay time from both wheel velocity and wheel deceleration information. In any event, the prior art has shown that wheel adaptive braking can be advantageously provided by considering a control wheel's velocity and deceleration and the past history thereof.

It has been discovered that in the use of prior art adaptive braking systems under certain road and braking conditions it is still possible for the adaptive braking system to assume automatic braking control even though better braking characteristics would have been achieved had manual braking control been retained. This type of false triggering of the adaptive braking system can occur, for example, when a wheel is initially braked on a slippery low frictional coefficient surface so that it rapidly decelerates past the first reference level and thereafter the wheel deceleration of the vehicle and velocity characteristic history are such to initiate automatic braking control. If, however, just prior to initiating of automatic braking control the wheel should move on to a high frictional coefficient surface thereby accelerating the wheel so that the first deceleration reference level is no longer exceeded it is still possible using prior art systems for auatomatic braking control to be assumed and braking pressures to be modulated even though under the conditions described reduced braking efficiency would result. Similar false triggering of the adaptive braking system can occur when the wheel is moving over a rough road surface resulting in wheel shocks which are detected by the wheel sensor during braking at apparently high acceleration peaks, even though wheel skid is not imminent.

SUMMARY OF THE INVENTION

This inopportune triggering of the adaptive braking system can be cured by the use of a latching gate which prevents automatic braking control from occurring until there is present at the gate input the signal signifying that the wheel is exceeding the first deceleration reference level and simultaneously that the proper history of wheel velocity and decelertion has been observed.

It is thus one object of this invention to provide for a wheeled vehicle an adaptive braking system which includes a latching gate for preventing false triggering of automatic control means of the vehicle braking system.

It is another object of this invention to provide a latching gate of the type described which is fully compatible with previously disclosed adaptive braking systems.

In the aforementioned patent application there was explained how an adaptive braking system delay means assured that automatic braking control was assumed only after the control wheel had passed over the maximum point of the mu-slip curve, which is a plot of the tire-road interface frictional force versus wheel slip, curves which are well known in the art. The combination of the delay means and latching gate described herein will ensure even more fully that automatic braking control will be assumed only after the controlled wheel has passed over the maximum point of the mu-slip curve. It is thus one further object of this invention to provide delay means and a latching gate for an adaptive braking system which will inhibit automatic braking control of a controlled wheel until it has been assured that the wheel has passed over the maximum point of the mu-slip curve.

These and other objects of the invention will become obvious from the following description of the invention.

BRIEF DESCRIPTION OF THE DRAWINGS

FIG. 1 is a block logic diagram which illustrates the invention.

FIG. 2 is a modified block diagram of an adaptive braking system control channel which includes the invention in a simplified form.

FIG. 6 is a partial schematic which illustrates a further form of the invention.

DESCRIPTION OF THE PREFERRED EMBODIMENT

Figure 3:
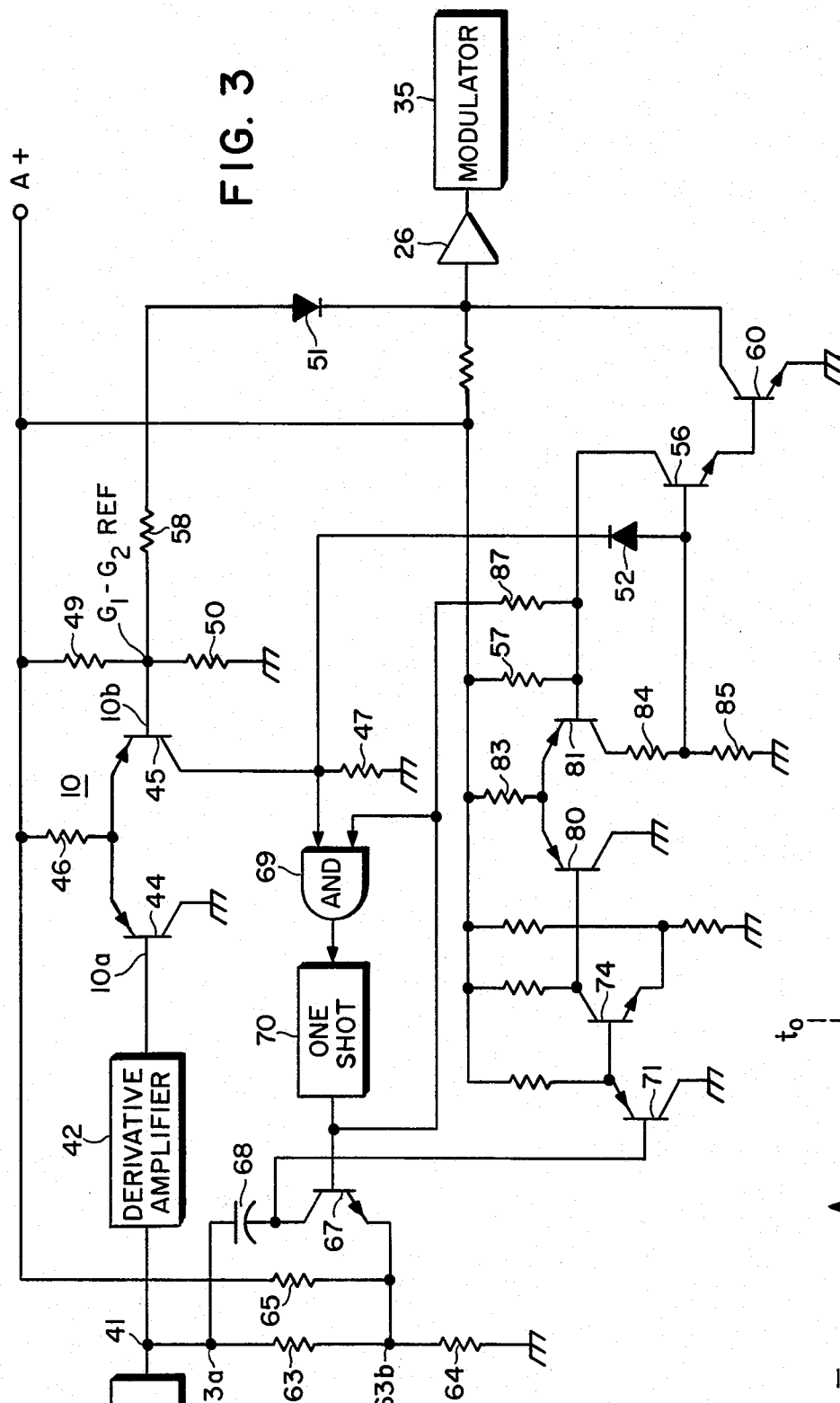
FIG. 3 is a modified schematic of an adaptive braking system control channel which shows in detail one form of the invention.

In the figures, like numerals refer to like elements. Referring particularly to FIG. 1, there is seen a simplified block diagram of the invention. A signal proportional to the acceleration (including negative acceleration) of a control wheel is obtained from a sensor means cooperating with the control wheel. Such sensors operating on mechanical, electrical or other principles are well known to those skilled in the art and need not be described here. This control wheel signal is applied to a first input tap 10a of a comparator 10. An electronic switch 12 has applied to input taps 13 and 14 thereof respectively $G_1$ and $G_2$ reference signals, provided by means not shown at this time but will be shown later, via lines 12a, 12b respectively. Switching arm 16 connects selectively input taps 13 and 14 to output tap 15 which is connected to the second input terminal 10b of comparator 10.

The output signal from comparator 10 is applied as one input 25a to AND gate 25 and as one input 20a to OR gate 20. The output from OR gate 20 is applied to the input tap 22a of a slip computer 22 to thus trigger this element to perform its function. The function of the slip computer is to delay automatic control of the vehicle's braking system until after certain wheel velocity and wheel deceleration criteria have been satisfied. Accordingly, a signal proportional to wheel speed and derived from a wheel sensor, not shown but which is well known to those skilled in the art is applied at input terminal 22b while, as aforementioned, a signal corresponding to wheel acceleration is applied to input terminal 22a. Two types of slip computers will be shown below. Briefly, one computer, when triggered by the signal at terminal 22a memorizes the instantaneous value of wheel speed at terminal 22b and thereafter compares the memorized wheel speed with subsequent instantaneous wheel speed during a predetermined time period. If during this time period the comparison becomes favorable an output signal is generated. A second type of computer intergrates the wheel acceleration signal with respect to time and compares it continuously to instantaneous wheel speed. When this comparison becomes favorable a computer output signal is generated. A third type of slip computer whose use in the invention should become obvious as this description proceeds is a computer which integrates wheel acceleration with respect to time and compares this integration with a fixed reference level, with the computer output being generated when the comparison becomes favorable.

Figure 5:
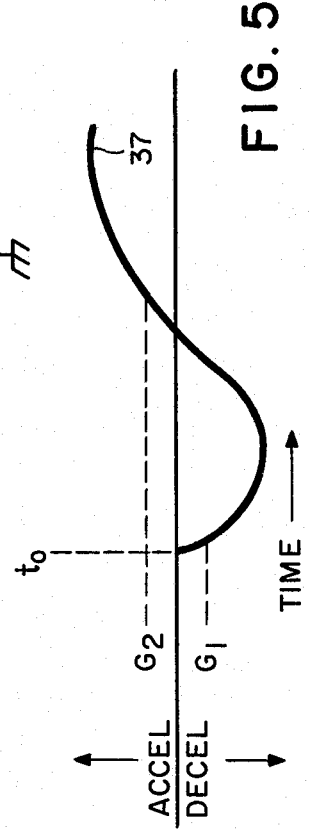
FIG. 5 is a graph of wheel acceleration versus time during a portion of an adaptive braking system controlled stop.

Returning to FIG. 1, AND gate 25 generates an output whenever its inputs 25a and 25b are energized, that is, when wheel deceleration exceeds the $G_1$ reference level and the slip computer is generating an output. The AND gate output is applied via amplifier 26 to a modulator 35 to reduce braking pressure at a controlled wheel. Amplifier 26 output is also applied via line 30 and through OR gate 20 to the slip computer 22 to insure it will continue to generate an output, and via line 31 to electronic switch 12 which causes switch arm 16 to now bridge terminals 14 and 15 so that the $G_2$ reference level is now applied to the input terminal 10b of comparator 10. Referring to FIG. 5 which is a graph of wheel acceleration with respect to time where brakes are applied at time $t_0$ it can be seen that the $G_1$ reference level is a level of wheel deceleration while the $G_2$ reference level which here is shown as some small value of acceleration but which may be a value of deceleration so long as it is in the direction of positive acceleration with respect to $G_1$. Thus, with the comparator input tap 10b now being referenced to the $G_2$ reference level the wheel must accelerate not only back through the $G_1$ reference level but now it must accelerate to the $G_2$ reference level before the output from comparator 10 will be extinguished. In this manner the signal to modulator 35 is latched on once it is generated and unlatched only when the wheel accelerates to the $G_2$ reference level.

Referring to FIG. 2 which is a modified block diagram of an adaptive braking system control channel including the invention, a sensor means 40, of the type well known to those skilled in the art, includes a wheel speed sensor mounted on or in proximity to and sensing the rotational speed of a wheel whose braking characteristics are to be controlled. Suitably, the wheel speed sensor generates a frequency linearly related to wheel speed which is converted to a wheel speed signal comprising a d.c. voltage level proportional to wheel rotational speed. This wheel speed signal appears on terminal 41 and is applied to derivative amplifier 42 which generates in response thereto a d.c. voltage level proportional to wheel acceleration at input terminal 10a of comparator 10. Comparator 10 is comprised of transistors 44 and 45 differentially connected and having emitter terminals commonly connected and connected through bias resistor 46 to the positive A+ terminal of a d.c. voltage supply. The collector of transistor 44 is connected directly to ground while the collector terminal of transistor 45 is connected through resistor 47 to ground. The second input 10b of comparator 10, that is at the base electrode of transistor 45, is connected to a voltage determined by the divider network comprised of resistors 49 and 50 connected across the d.c. power supply. The voltage at terminal 10b comprises the $G_1$ reference level when diode 51 is back-biased and comprises the $G_2$ reference level when diode 51 is forward-biased. It can thus be seen that diode 51 basically comprises electronic switch 12 of FIG. 1. The output from comparator 10 is taken at the collector-electrode of transistor 45 and applied to input terminal 22a of slip computer 22. The aforementioned speed signal at terminal 41 is connected to the second input terminal 22b of the slip computer. The output signal from the slip computer 22 is coupled through diode 52 to input terminal 22a. Diode 52 thus performs the OR function of gate 20, FIG. 1, and additionally, as will be explained below, performs, at least in part, the function of AND gate 25. The output signal from slip computer 22 is also connected to the amplifier comprised of transistors 56 and 60, whose output is taken from the collector-electrode of transistor 60 through amplifier 26 to drive modulator 35.

The operation of the circuit of FIG. 2 is as follows. Change in wheel speed as evidenced by the speed signal at terminal 41 indicating that a wheel is decelerating is processed by the derivative amplifier 42 to generate a positive-going signal at terminal 10a. When the voltage at terminal 10a exceeds the reference voltage at terminal 10b, indicating at that time that the wheel has decelerated through the $G_1$ reference level, transistor 44 is shut off and transistor 45 becomes conductive. The collector of transistor 45, which before this transistor becomes conductive is essentially at ground potential, now rises due to the current flow from transistor 45. This rising voltage is not only applied to the input terminal 22a but also back-biases diode 52 for reasons to be made clear below. Slip computer 22 is thus triggered to consider the speed signal at terminal 22b and the acceleration signal at terminal 22a. If this computer determines that automatic braking control of the vehicle should be assumed, it generates an output which is applied to the base of transistor 56. It will be noted that if diode 52 is forward-biased the voltage at terminal 22c will be limited by the voltage drop through this transistor and through resistor 47. It will also be remembered that diode 52 is back-biased whenever transistor 45 is conductive, which occurs when the wheel is decelerated past the $G_1$ reference level. Thus, if at the time the slip computer generates an output the wheel is still decelerating past the $G_1$ reference level diode 52 will be back-biased, and the voltage at terminal 22c will not be limited thereby. Thus transistors 56 and 60 can be forward-biased to generate an output signal to be applied through amplifier 26 to modulator 35 which thereby reduces braking pressure at the controlled wheel. When transistor 60 becomes conductive, the voltage at its collector-electrode which to this time has been essentially at the A+ voltage level, thus back-biasing diode 51, now drops toward ground thus forward-biasing diode 51. The forward-biasing of diode 51 draws current through resistor 49 and 58 to drop the voltage at terminal 10b. This new voltage level comprises the $G_2$ reference level and it should be obvious that transistor 45 is made more conductive thereby. In other words, the wheel must accelerate not only to the $G_1$ reference level but now it must accelerate to the $G_2$ reference level before transistor 45 ceases conducting and transistor 44 will conduct.

If, however, at the time slip computer 22 generates its output signal the wheel no longer exceeds the $G_1$ reference level, transistor 45 will be non-conductive and its collector will be essentially at ground potential, so that diode 52 is forward-biased. The voltage at terminal 22c will thus be limited thereby and will comprise essentially the voltage drop across a single diode. This voltage will be insufficient to turn on transistors 56 and 60, since the voltage to turn on these transistors must be at least equal to the voltage drop across the base emitter junctions of these two transistors. It should now be obvious how diode 52 performs the OR and AND functions of the gates 20 and 25 of FIG. 1.

Refer now to FIG. 3 wherein elements essentially identical to elements shown in FIGS. 1 and 2, and conveniently noted thereas are marked with like numerals. There is also shown a divider network comprised of resistors 63 and 64 serially connected between the speed signal terminal 41 and ground. A voltage proportional to some percentage of instantaneous wheel speed is determined by the voltage divider and appears across resistor 63 at terminals 63a and 63b. Also connected across resistor 63 is a capacitor 68 serially connected with the collector-emitter circuit of transistor 67. Thus, so long as transistor 67 is saturated a voltage essentially equal to the voltage across resistor 63 will be impressed across capacitor 68. A resistor 65 connected between the A+ voltage terminal and emitter of transistor 67 applies emitter bias to this transistor. A one-shot 70 has its input terminal connected through AND gate 69 to the collector-electrode of transistor 45 and is triggered to generate an output pulse whenever the voltage at that electrode swings towards the A+ voltage, that is, when the wheel decelerates past the $G_1$ reference level. In its quiescent state the one-shot generates a positive voltage which causes transistor 67 to saturate. The one-shot 70 output pulse, when triggered, is a negative-going pulse which turns off, for the period of the one-shot, transistor 67 thus isolating across capacitor 68 a voltage proportional to a predetermined percentage of the wheel speed at the instant the wheel decelerated to the $G_1$ reference level. The one-shot 70 output is also fed back to be an input to AND gate 69. Since one-shots normally trigger on a signal transition, this feedback and gate arrangement permits the one-shot to retrigger, after a normal reset period, if the voltage at the collector electrode of transistor 45 remains high.

One side of capacitor 68 is connected to the wheel speed signal at terminal 41 while the other side of the capacitor is connected to the base electrode of the transistor 71. Transistor 71 operates as an emitter follower so the signal at its base electrode is applied, except for the diode drop across its base-emitter, to the base electrode of transistor 74, which operates as an amplifier. Thus, when the vehicle is braked and the wheel decelerates to the $G_1$ reference level the one-shot is triggered and a voltage proportional to a predetermined percentage of instantaneous wheel speed is trapped across capacitor 68. As the wheel continues to slow down and since the voltage across capacitor 68 must now remain constant, and since the voltage at terminal 41 is decreasing, the voltage at the base electrode of transistor 71 must decrease in accordance therewith. This voltage is transferred through emitter-follower 71 and undergoes a phase reversal in amplifier 74 resulting in an increasing and amplified voltage at the base electrode of transistor 80. The comparator comprised of transistors 80 and 81 is arranged so that transistor 81 is normally biased by resistor 57, which is connected between its base-electrode and positive A+ terminal, to be normally non-conductive for all possible conditions of voltage at the base electrode of transistor 80. However, during the one-shot 70 output pulse period, which it will be remembered is a negative-going pulse, this negative-going pulse is connected through resistor 87 to the base electrode of transistor 81, thus supplying an enabling bias to transistor 81. Under these conditions, that is, during the one-shot output pulse period, if the voltage at the collector electrode of transistor 74 becomes higher than the voltage at the base electrode of transistor 81, transistor 80 will turn off and transistor 81 will turn on allowing current to flow from the A+ terminal through resistor 83, the emitter collector circuit of transistor 81 and resistors 84 and 85 to ground. The voltage at the base of transistor 56 thus increases, turning on that transistor and transistor 60, so long, as previously noted, diode 52 remains back-biased by the positive voltage on the collector of the transistor 45 indicating that the wheel is still decelerating below the $G_1$ reference level. The resulting output signal at the collector of transistor 60, as previously described, is amplified by amplifier 26 and applied to modulator 35 to reduce the braking at the controlled wheel. Additionally, as also previously described, diode 51 is now forward-biased thus dropping the voltage at terminal 10b to the $G_2$ reference level.

It will be noted that when transistor 56 becomes conductive its collector which is connected to the base electrode of transistor 81 approaches ground thus latching transistor 81 on. The circuit is thus latched and the modulator 35 will remain energized until the wheel accelerates to the $G_2$ reference level at which time the collector of transistor 45 will swing toward ground, thus forward-biasing diode 52 so that the voltage at the base electrode of transistor 56 is no longer sufficient to maintain that transistor and transistor 60 conductive, thus extinguishing the signal in the collector of transistor 60 to deactivate the modulator and to reverse-bias diode 51, thus returning the voltage at terminal 10b to the $G_1$ reference level.

Figure 4:
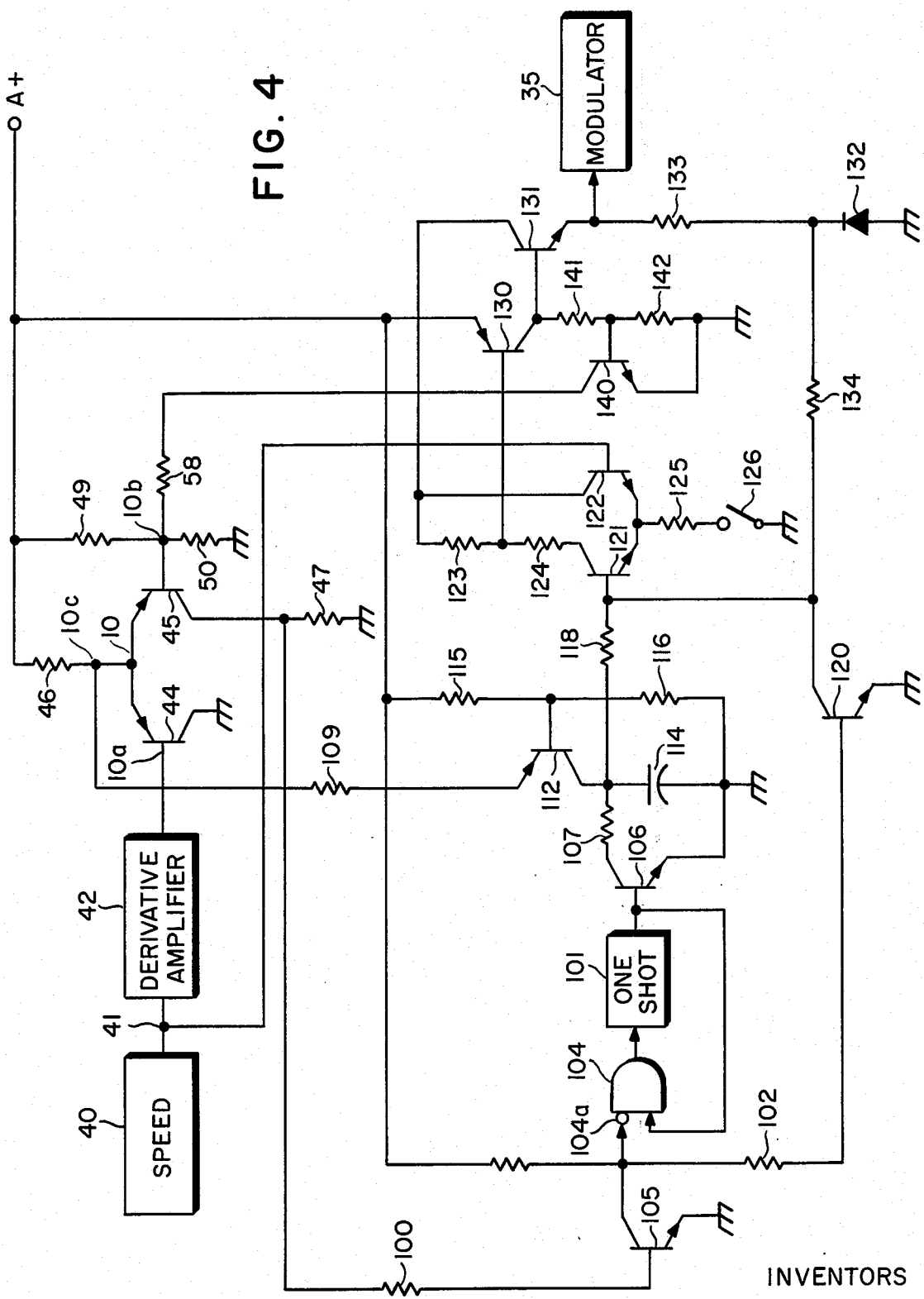
FIG. 4 is a modified schematic of an adaptive braking system control channel which shows in detail a second form of the invention.

Refer now to FIG. 4 which shows a modified schematic of a slightly different form of the invention which includes a slip computer means for integrating wheel acceleration with respect to time and comparing the results of the integration with the instantaneous wheel speed. In this figure elements equivalent to elements shown in the first three figures are marked with like numerals. As previously explained the speed signal appears at terminal 41 and an acceleration signal appears at terminal 10a. The speed sensor means 40 and derivative amplifier 42 have already been described. Also as described above, the comparator comprised of transistors 44 and 45 has a $G_1$ reference level, determined by the voltage divider comprised of resistors 49 and 50 connected across the A+ supply, impressed at the base electrode of transistor 45, normally biasing that transistor non-conductive with transistor 44 conductive. When the voltage at terminal 10a swings past the voltage at the base electrode of transistor 45, indicating that the sensed wheel has decelerated past the $G_1$ reference level, transistor 45 turns on so that the voltage at the latter transistor's collector electrode swings positive and acting through resistor 100 triggers transistor 105 conductive. The resulting drop in voltage at the collector electrode of transistor 105 acting through resistor 102 turns off transistor 120 which until that time had shorted the base electrode of transistor 121 to ground.

One-shot 101 is triggered when the negative-going signal at the collector electrode of transistor 105 acting through the inhibit input terminal 104a of AND gate 104 permits that gate to open so as to pass the one-shot quiescent output signal fed back therethrough. One-shot 101 generates in response thereto a negative-going output pulse. Gate 104 and the feedback of the one-shot output as an input thereto performs a function essentially identical to function performed by the gate and one-shot of FIG. 3 and, as in that figure, allows the one-shot to be retriggered if the voltage at the collector electrode of transistor 45 remains high.

A transistor 106 has its base electrode connected to receive the output signal from one-shot 101 and its collector-emitter circuit is connected in series with resistor 107 across capacitor 114. This capacitor has one end connected to ground and the other end connected to receive current from the constant current generator comprised of transistor 112 having its base electrode biased by the voltage divider comprised of resistor 115 and 116 connected across the A+ voltage source. Drive for constant current generator 112 is provided by connecting its emitter electrode to terminal 10c through resistor 109.

Resistor 46 is chosen to be a low impedance while the impedance looking into the emitter electrode of transistor 45 is relatively high. Hence transistor 44 will operate as an emitter follower. The signal at terminal 10c, the emitter of transistor 44, is thus essentially equal to the signal at terminal 10a. The drive for the constant current generator 112 is thus essentially equal to the magnitude of the acceleration signal. The charges delivered to capacitor 114, assuming transistor 106 is non-conductive, are accordingly at a rate proportional to the magnitude of the acceleration signal and the voltage across this capacitor is a measure of the time integral of the acceleration signal. This integrated signal is applied through resistor 118 to the base electrode of transistor 121 which, together with transistor 122, comprises a differential amplifier operating as a comparator with a second input signal being applied to the base electrode of transistor 123, which signal comprises the speed signal at terminal 41. The commonly connected emitter electrodes of the differentially connected transistors are connected to ground through resistor 125 and switch 126, if closed. Switch 126 is ganged to the vehicle brake pedal, thus permitting the differential amplifier to be operative only when the brake pedal is depressed. It will also be noted that before the wheel decelerates to the $G_1$ reference level, transistor 120 will be conductive due to the forward-bias applied to its base electrode from the collector electrode of transistor 105 acting through resistor 102. Thus the base electrode of transistor 121 will be grounded and the voltage at its collector electrode, which is connected through resistor 123 and 124 to the A+ voltage bias, will approach the A+ level, thus turning off transistors 130 and 131 so that modulator 35 is not energized. However, at the time transistor 105 is energized and its collector electrode goes to ground, indicating the sensed wheel has decelerated past the $G_1$ level, transistor 120 is turned off. One-shot 101 is triggered and its output pulse turns off transistor 106 so that charges may now be accumulated on capacitor 114. When the resultant voltage at the base of transistor 121 exceeds the voltage at the base of transistor 122, that is when the integrated signal exceeds the magnitude of the speed signal, transistor 121 becomes conductive so that its collector voltage swings negative and transistors 130 and 131 become conductive thus energizing modulator 35.

A transistor 140 has a base electrode receiving bias from the voltage divider comprised of resistors 141 and 142 connected between the collector electrode of transistor 130 and ground. Its emitter-collector circuit is connected in series with resistor 58 between terminal 10b and ground. Normally, that is before the sensed wheel decelerates past the $G_1$ reference level, transistor 130 is nonconductive and the base electrode of transistor 140 is grounded, turning off that latter transistor. Thus no terminal 10b current will flow in resistor 58 and the voltage at terminal 10b is determined solely by the current flow through resistors 49 and 50. However, once the sensed wheel decelerates past the $G_1$ reference level and transistor 130 becomes conductive as previously described, current flows through resistors 141 and 142. Transistor 140 becomes conductive so that current flows in its collector-emitter circuit, which current comprises terminal 10b current flowing in resistor 58. The voltage at terminal 10b accordingly drops to the $G_2$ reference level which as before holds transistor 45 conductive until the sensed wheel exceeds this new reference, at which time transistor 45 will become non-conductive, thus turning off transistors 130 and 140 to restore the $G_1$ reference voltage level at terminal 10b.

If during the time that charges are accumulating on capacitor 114 but before transistor 130 becomes conductive, the sensed wheel should accelerate past the $G_1$ reference level, the voltage at the collector-electrode of transistor 45 will move towards grouond thus causing transistor 105 to become non-conductive. Transistor 120 will become conductive to thus remove charges from capacitor 114 through resistor 118. However, the resistor should be large enough to prevent rapid discharge of capacitor 114 so that if the wheel is accelerated above the $G_1$ level for only a short period of time, such as might be caused by noise in the circuit during a low deceleration stop or by the operation of the wheel on a bumpy surface, the charge in capacitor 114 will be essentially unaffected. However, it should also be noted that due to the action of transistor 120 it is impossible for transistor 121 to become conductive even though sufficient charges build across capacitor 114 unless at the same time the wheel is also decelerating below the $G_1$ reference level. Thus it can be seen that transistor 120 performs the same function as AND gate 25 in FIG. 1.

The latching function of the circuit is performed as follows. When transistor 131 becomes conductive and thus energizes modulator 35, a signal is applied through resistors 133 and 134 to the base electrode of transistor 121 thus latching that transistor conductive. It will also be remembered that when transistor 121 initially became conductive transistor 140 became conductive to switch the reference level at terminal 10b to the $G_2$ reference level. Thus the modulator 35 will remain energized until the wheel accelerates to the $G_2$ reference level at which time the collector electrode of transistor 45 will swing negative thus causing transistor 120 to become conductive. This latter action grounds the base electrode of transistor 121 to thereby extinguish the modulator 35 energization signal and to turn off transistor 140 so that the $G_1$ reference level is restored at terminal 10b. Additionally, at the completion of the one-shot 101 output pulse transistor 105 becomes conductive to allow the charges collected on capacitor 114 to drain off to ground.

FIG. 6, reference to which should now be made, shows the invention as used in an adaptive braking system employing a slightly different logic than that seen in FIG. 4. The elements comprising the system of FIG. 6 are identical, schematically, to the elements of the system of FIG. 4. The sole difference is that the base of transistor 122 is disconnected from the speed signal terminal 41, as shown in FIG. 4, and is connected to a reference voltage source. More particularly, as in FIG. 4, differentially connected transistors 121 and 122 comprising a comparator, have their commonly connected emitters connected to ground through resistor 125 and brake pedal ganged switch 126. The collector of transistor 122 is connected directly to the A+ voltage source while the collector of transistor 121 is connected to the A+ voltage source through the serially connected resistors 123 and 124, with comparator output being taken from the junction of resistors 123 and 124. The base of transistor 121 is connected through resistor 118 to the integrated acceleration signal appearing across capacitor 114 of FIG. 4 while the base of transistor 122 is connected to a reference voltage (not shown). In this case, the adaptive braking modulator will be energized if the integrated acceleration signal becomes equal to the reference signal at the base of transistor 122. Of course, as before, the modulator can only be energized if the $G_1$ deceleration level is still present and the error signal energizing the modulator will also cause the $G_2$ reference signal to appear and will additionally latch the error signal on in the manner previously described with respect to FIG. 4.

Although only certain embodiments of the invention have been shown and the invention has been shown in the environment of an adaptive braking system described in a previous patent application, it should be obvious that the invention can be used with other adaptive braking systems having suitable signals, for example, signals corresponding to those generated at the $G_1$ and $G_2$ reference levels described herein. It should also be noted that the exact form of the brake modulator is not described as it does not comprise the invention herein, and indeed, the invention may be used with any type of braking system, for example, hydraulic, pneumatic, etc., the modulator being properly chosen. Accordingly, the inventors claim the subject matter included within the true scope and spirit of the appended claims.

The invention claimed is:

1. In a wheeled vehicle having a wheel braking system whereby said vehicle wheels are braked by a braking force, an adaptive braking system control channel comprising:
   means for generating a first electrical signal correlated to the speed of at least one vehicle wheel;
   means for generating a second electrical signal correlated to the acceleration of at least one vehicle wheel;

means for generating a reference electrical signal level corresponding to negative acceleration of a vehicle wheel;

means for generating a third electrical signal while said second signal exceeds said reference level;

means triggered by said third signal and responsive to subsequent changes in said first and second signals for generating an output signal;

means responsive to an error signal for reducing said braking force; and, means for generating said error signal while said output signal and said third signal are generated.

2. An adaptive braking system control channel as recited in claim 1 wherein said means for generating a reference electrical signal level includes means responsive to said error signal for varying said reference electrical signal level in a direction corresponding to a more positive wheel acceleration.

3. An adaptive braking system as recited in claim 2 wherein said means for generating a reference electrical signal level comprises a source of voltage and a voltage dividing network connected thereacross, said means for varying said reference electrical signal level comprising means responsive to said error signal for varying the voltage division characteristics of said voltage dividing network, said reference signal being tapped from said voltage dividing network.

4. An adaptive braking system as recited in claim 3 wherein said means for varying the voltage division characteristics of said voltage dividing network comprises an electrical network shunting at least a portion of said voltage dividing network and including semiconductor means biased from a first conductive state to a second conductive state by said error signal.

* * * * *